United States Patent [19]

Petzold et al.

[11] Patent Number: 5,004,086
[45] Date of Patent: Apr. 2, 1991

[54] CLUTCH ASSEMBLY FOR A MOTOR VEHICLE

[75] Inventors: Rainer Petzold; Walter Fritz, both of Friedrichshafen; Norbert Wiencek, Hagnau, all of Fed. Rep. of Germany

[73] Assignee: Zahnradfabrik Friedrichshafen AG, Friedrichshafen, Fed. Rep. of Germany

[21] Appl. No.: 445,616

[22] PCT Filed: Jun. 21, 1988

[86] PCT No.: PCT/EP88/00545
§ 371 Date: Dec. 19, 1989
§ 102(e) Date: Dec. 19, 1989

[87] PCT Pub. No.: WO88/10376
PCT Pub. Date: Dec. 29, 1988

[30] Foreign Application Priority Data

Jun. 27, 1987 [DE] Fed. Rep. of Germany ....... 3721318

[51] Int. Cl.$^5$ ............................................. F16D 25/14
[52] U.S. Cl. .................................. 192/85 C; 192/91 R
[58] Field of Search ................... 192/85 R, 85 C, 91 R

[56] References Cited

U.S. PATENT DOCUMENTS

| 3,251,439 | 5/1966 | Randol | 192/3.58 |
| 3,322,248 | 5/1967 | Kaptur et al. | 192/85 R X |
| 3,379,291 | 4/1968 | Randol | 192/91 R X |
| 4,234,066 | 11/1980 | Toyota et al. | 192/91 R X |

FOREIGN PATENT DOCUMENTS

| 142221 | 5/1985 | European Pat. Off. . |
| 0195463 | 9/1986 | European Pat. Off. . |
| 3443064 | 6/1986 | Fed. Rep. of Germany . |
| 60-11722 | 1/1985 | Japan ....................... 192/85 C |
| 1393285 | 5/1975 | United Kingdom . |
| 2153035 | 8/1985 | United Kingdom . |

Primary Examiner—Richard Lorence
Attorney, Agent, or Firm—Herbert Dubno

[57] ABSTRACT

A motor-vehicle clutch assembly including a start-up and shifting clutch arranged between the driving engine and the gearbox, selectively engaged therebetween by the clutch controlled by an electronic control device and by a complex actuating unit arranged on the clutch. The complex actuating unit consisting of an actuating cylinder for a clutch release lever, several, solenoid valves controlling the auxiliary power and a travel-measuring device. The unit is provided with a singly detachable connection for the pressure supply and for the connection with the electronic control device and the power source, only one plug junction is provided.

13 Claims, 2 Drawing Sheets

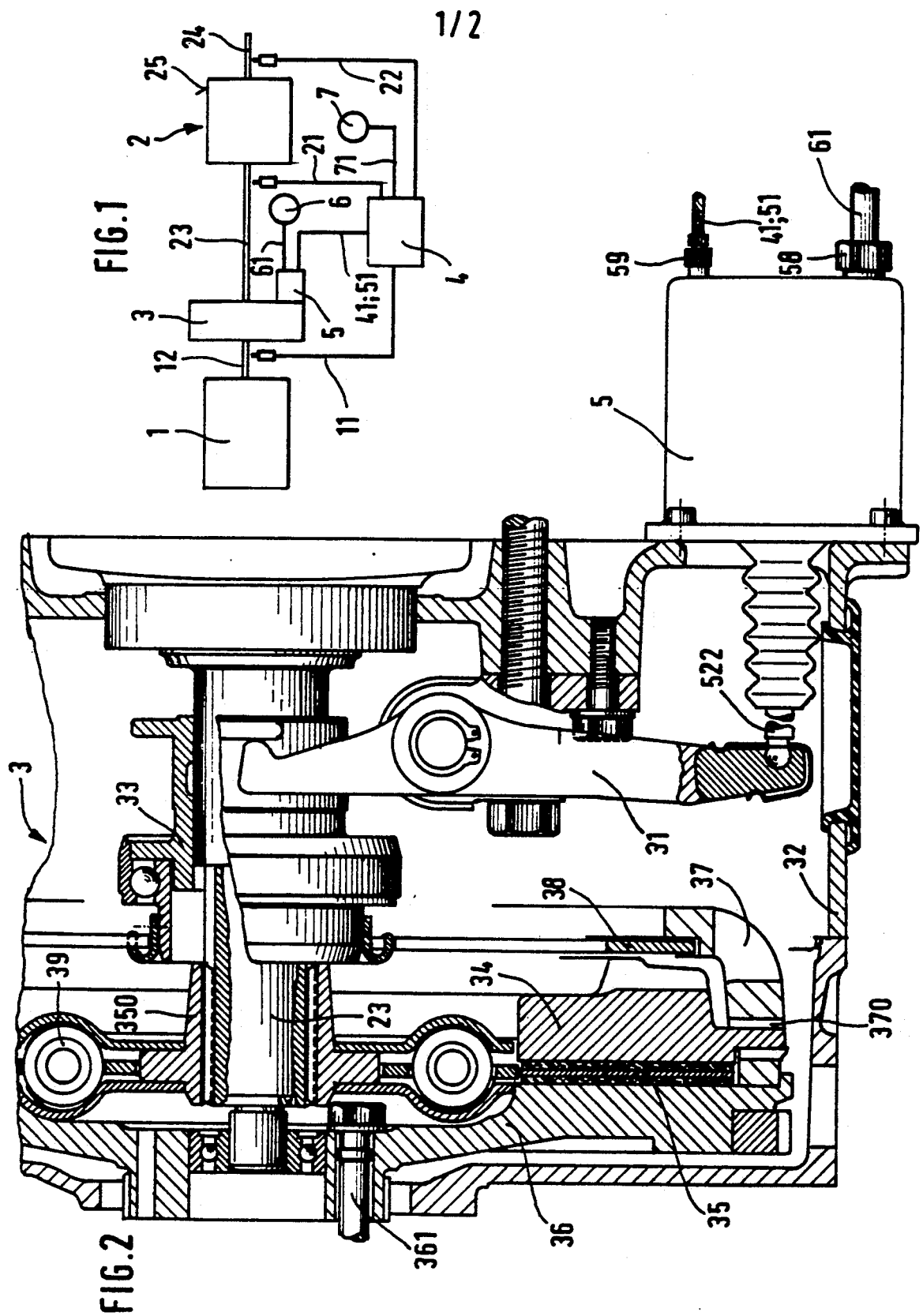

CLUTCH ASSEMBLY FOR A MOTOR VEHICLE

CROSS REFERENCE TO RELATED APPLICATIONS

This is a national phase application of PCT/EP88/00545 filed 21 June 1988 and based, in turn, upon a German application Ser. No. P37 21 318.0 filed 27 June 1987 under the International Convention.

FIELD OF THE INVENTION

The invention relates to a motor-vehicle clutch assembly actuated by auxiliary power and arranged between a driving engine and a gearbox, the assembly including an actuating unit controlled by a combination of controllable valves and electronic means. Various embodiments of such clutches are known—ATZ Issues 3 and 4, 1959.

BACKGROUND OF THE INVENTION

A modern clutch is known from DE-OS 34 38 594, describing a clutch control in response to a signal produced by a position transmitter via an electric positioning device—electric servomotor—and a transmitting- —and receiving cylinder adjusting the clutch in order to suppress vibrations coming for instance from the driving engine.

Further, from the PCT/EP86/0544 which was not previously published, it is known to use signals coming from an electronic control device 6 in a control unit 5 for influencing an auxiliary power 50. This influenced auxiliary power 50 is directed over a duct 51 to a positioning device 4 for a clutch 1. Further, between clutch 11 and the electronic control device 6, a travel-measuring device 11 is provided. This clutch is primarily used for start-up and the same clutch according to German application P 37 10 015.7, which was not previously published either is used for the elimination or prevention of vibrations in the drive train.

As a result of electronic control of the auxiliary power, such clutches are particularly well suited for automatic motor-vehicle clutches.

However, the expense for the entire arrangement is relatively high and the arrangement has a tendency for interlinking of the individual devices.

OBJECTS OF THE INVENTION

It is therefore the object of the present invention to further develop a clutch avoiding drawbacks inherent to presently available clutches.

This problem is solved by combining the actual positioning device for the clutch with the control unit for the auxiliary power and with the integration of the travel-measuring device in one complex actuation unit resulting in a simpler more cost-efficient and easily accessible construction, which also creates big advantages during assembly. As a result of the direct connection of the solenoid valves with the actuation cylinder, the typical hose lines can be dispensed with, so that the susceptibility to potential defects is reduced. Furthermore, the functional characteristics can be improved, because the required amount of auxiliary power—compressed air, hydraulic oil, transmission oil—can be smaller than in case of separate control—and power devices. A higher operational safety results also for the travel-measuring device, since it is arranged directly on the actuating cylinder.

By combining the functions of three devices in one housing, the number of connections required for the power—and control lines is considerably reduced. Particularly advantageous is the arrangement of only one multiple plug junction for this power—and control lines, which is also used for the readings of the travel-measuring device and located between the electronic control device and the actuating unit.

If the required venting of the actuating cylinder by, at least, one solenoid valve, has a connection possibility at the actuating unit, then, for instance, in the case of compressed air it is possible not only to mount a sound damper, but also to mount a suitable extension, which makes possible the water crossing capability also with regard to the clutch and its actuation. Due to at least one solenoid valve for each actuating unit of the clutch in the actuating cylinder, a precise engagement and disengagement of the clutch is possible with respect to the path and speed, whereby one solenoid valve control the filling of the piston space and the other solenoid valve control the venting thereof, because, as a rule, the clutch is closed by spring means and as soon as the clutch is released a lever is shifted by the piston of the actuating cylinder. If each actuating unit is provided with two solenoid valves with different shutters it is practically possible to achieve any desired opening- —and closing speed via the electronic control and due to a suitable combination valves. It is particularly advantageous to operate the clutch with means for compressed air as an auxiliary force, when a compressed-air source is already available in the vehicle for other purposes. If the actuating cylinder, measured at the power stroke, is provided with a bigger total stroke, the unavoidable wear of the clutch can be automatically compensated through the travel-measuring device. Having the solenoid valves opened via an electric control and closed when there is no power, in the case of power failure or disturbance in the electronic system, the position of the clutch existing at that moment is maintained, so that dangerous and undesired shiftings of the clutch can be prevented.

The invention is not limited to the combination of the characteristic features of the invention. For the person skilled in the art further possibilities of the structure are available.

BRIEF DESCRIPTION OF THE DRAWING

Further objects of the invention features and advantages will become more readily apparent form the following description, reference being made to the accompanying drawing in which:

FIG. 1 is a block diagram of a clutch connection,

FIG. 2 is a longitudinal sectioned view of a clutch with complete actuating unit.

SPECIFIC DESCRIPTION

Figure 3:
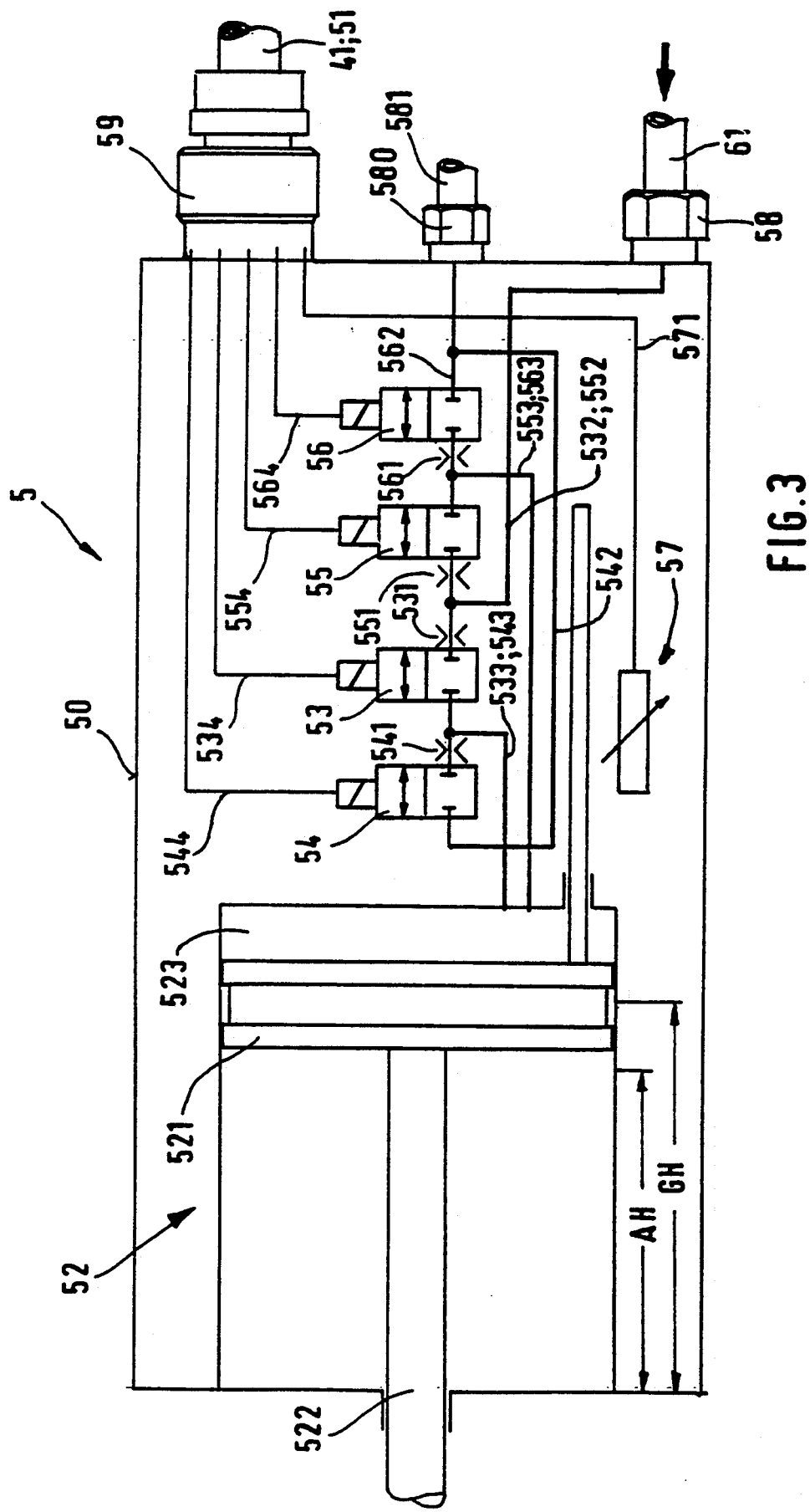
FIG. 3 is a schematic view of the preferred embodiment of the invention.

As seen in FIG. 1, the clutch for a motor vehicle is shown in a block diagram in which, a start-up and shifting clutch 3 is provided between a driving engine 1 and a gearbox 2. The clutch 3, is connected with a complex actuating unit 5, which is connected via a pressure duct 61 with a pressure-medium source 6 of an auxiliary power and via an electric line 41 with an electronic control device 4. The power supply takes place over the line 71 coming from a power source 7. The engine speed of the engine output shaft 12, via line 11, the rotational speeds of the gearbox input shaft 23, via line 21, and of the gearbox output shaft 24, via line 22, are fed to the electronic control device 4. Further, the electronic control device 4 receives information such as described in the PCT/EP 86/00544, respectively the German application Ser. No. 37 10 015.7.

According to FIG. 2, the complex actuating unit 5 is flanged adjacent the clutch housing 32 of a dry start-up and shifting clutch 3 and is built as a pulled diaphragm spring. The clutch disk 35 is nonrotatably mounted directly on the input shaft 23 of the gear box 2, between the flywheel disk 36 and the pressure plate 34.

The flywheel disk 36 is connected via the screws 361 with the driven shaft 12 of the driving engine 1, so that the flywheel disk 36 rotates the support 37 rigidly connected thereto, together with the pressure plate 34 and also with the diaphragm spring 38, with the respective engine speed.

A clutch release lever 31 is pivotally supported on the clutch housing 32, this lever engaging the disengagement member 33 and shifted by the complex actuating unit 5. Between the hub 350, the clutch disk 35 and the clutch disk itself, a generally known torsional-vibration damper 39 is provided.

FIG. 3 shows a schematic representation of the construction of the complex actuating unit 5, wherein a piston 521 can be moved in one direction by pressure media—namely to the left—, while the reverse motion is accomplished by springs—in this example by the diaphragm spring 38 of the start-up and shifting clutch 3, via the piston rod 522 and the clutch release lever 31 and the disengagement member 33 shown in FIG. 2. The total stroke GH of the piston 521 and the power stroke AH are so selected that by taking into consideration the ratio in the clutch release lever 31, the clutch 3 is always securely opened over the power stroke. A definite wear and assembly tolerance in the clutch are taken into account in the total stroke. A travel-measuring device 57 also cooperates with the piston 521, and the information coming from this device is directed to the electronic control device 4, via the line 571 and multiple plug 53, 55 junction 59 and the line 51. At least one solenoid valve preferably two, as shown in FIG. 3 are connected to a pressure—medium supply connection 58 via ducts 532 552, and via duct 61 to a pressure—medium source 6. Advantageously two solenoid valves 54, 56, have respective ducts 542, 562 leading connection 580. In the case of compressed air, as in our example, in the actuating unit 5 or at the venting connection 580 a sound damper is connected, which is not shown in the drawing. When the vehicle is equipped for water crossing capability, the sound damper or the end of the venting duct 581 can be arranged at a correspondingly high level. The second connections of the solenoid valves 53 to 56 are connected with the pressure space 523 of the actuating cylinder 52 via ducts 533, 543, 553 and 563. At least at one pressure-medium connection of the each solenoid valve restrictions or shutters 531, 541, 551, 561 can also be provided, through which the inflow and outflow of the pressure medium can be defined in cross section. Besides, the shutters are easily accessible, so that a replacement can be easily performed, primarily, from the outside. The solenoid valves 53 to 56 are also connected via electric lines 534, 544, 554, 564 with a multiple plug junction 59, arranged on the actuating unit 5 for connection with the electronic device 4 through lines 41, 51, so that this connection can be achieved with a single electric cable. The pressure ducts from the pressure-medium supply connection 58 to solenoid valves and to the pressure space 523 of the actuating cylinder 52, as well as the venting ducts from the latter via the solenoid valves to the venting connection 580 are built into the sing 50 of the actuating unit 5, for safety.

The clutch works as follows: In order to open the start-up and shifting clutch 3, the solenoid valves 53, 55 are opened by the electronic control device 4 via lines 41 and 534 and 554, so that the pressure medium, for instance compressed air, coming from the pressure-medium source 6 via duct 61, 532 and 552 and always available at the solenoid valves 53, 55 is directed via ducts 533, 553 to the pressure space 523. The piston in its starting position—which corresponds to the completely closed clutch—is pushed to the left, e.g. in the opening position. Via the piston rod 522, the clutch release lever 31 and the disengagement lever 33, the diaphragm spring 38 is lifted off the pressure plate 34 in the known manner, so that the pressure of the clutch disk 35 against the flywheel 36 is terminated. Without the pressure of the diaphragm spring 38, the pressure plate 34 can be displaced axially—to the right—in the guide 370 of the clutch housing 37, so that the drive train is opened.

The maximal opening speed can be adjusted over shutters 531, 551, by modifying the cross section of the pressure ducts. The clutch is closed by spring force, and in order for the closing spring—in this example the diaphragm spring 38—to be effective, the pressure space 523 has to be vented. For this purpose, the solenoid valves 54, 56 are triggered by the electronic control device 4 and the pressure space 523 is vented through the ducts 543, 563 leading to these solenoid valves and the ducts 542, 562 leading to the venting connection 580. Via the shutters 541, 561, it is possible to adjust the maximal venting speed of the pressure space 523, and thereby the closing speed of the clutch. However, the permanent, operationally conditioned influence takes place through the electronic control device 4. Therefor, for instance the solenoid valves 53 to 56 equipped with different shutters—two for each the filling and the venting of the pressure space 523—are kept open for different lengths of time and in a pulse-modulation procedure, so that constantly different filling—and venting conditions result, because the opening time for each valve can be additionally modified by modifying the pulse modulation. For simpler controls or in the case of appropriate solenoid valves, only one solenoid valves can be used for each - the filling and venting of the pressure space 523 -. Each motion of the piston 521 is detected by the travel-measuring device 57. With the detected and stored position of the piston when the clutch is closed, it is possible to establish in a simple manner the wear and the new condition with respect to the travel after repair work, so that the opening can always be insured with the same power stroke. Besides air, hydraulic- or brake oil can be used as a pressure medium.

We claim:

1. A drive train for a motor vehicle, comprising:
   a gearbox formed with an input shaft rotatable about an axis of rotation;
   an engine spaced from said gearbox and formed with an engine shaft coaxial with said input shaft;
   a clutch arranged in a torque transmission path between said engine and input shafts spaced from said gearbox and having an engaged position and a disengaged position; said clutch being provided with a clutch housing and with release means for releasing said engaging position of said clutch;

an actuating unit mounted on said clutch and including:
- an actuating unit directly connected with said clutch housing,
- a piston and cylinder unit including a cylinder formed in said actuating housing and a piston movable back and forth in said cylinder parallel to said axis of rotation and connected with said releasing means for displacing said clutch into said disengaged position,
- a plurality of solenoid values operatively connected with said piston and cylinder unit for actuating said piston,
- a single pressure supply connection mounted on said actuating housing for interconnecting said piston and cylinder unit and said valves with an external pressure supply source,
- a travel measuring device operatively connected with said solenoid valves mounted in said housing for controlling said engaged and disengaged positions of the clutch, and
- a single plug junction mounted on said actuating housing for connection to said measuring device said solenoid valves for selective operation thereof.

2. The drive train defined in claim 1, further comprising a venting connection mounted on said actuating housing and connected with said solenoid valves, at least one of the solenoid valves being connected with said venting connection.

3. The drive train defined in claim 2 wherein said solenoid valves are provided with respective replaceable shutters.

4. The drive train defined in claim 3 wherein said shutters are of a different size.

5. The drive train defined in claim 1 wherein a stroke of said piston in actuating cylinder is bigger than the required power stroke.

6. The drive train defined in claim 1 wherein the solenoid valves are closed when the power is off.

7. A clutch assembly of a motor vehicle, said clutch assembly being arranged between an engine provided with an engine shaft and a gear box provided with a gear shaft, said clutch assembly comprising:
- a rotatably fixed housing, said fixed housing being formed with a pair of walls, one of said walls being provided with an opening;
- a clutch housing rotatably mounted in said fixed housing;
- a gear shaft mounted on said clutch housing and rotatable therewith about an axis of rotation, said gear shaft being provided with engaging means for connecting said gear shaft with an engine shaft extending parallel to said axis of rotation; and
- a casing mounted on said rotatably fixed housing and provided with a control unit for regulating the engaging means, said control unit including:
  - a cylinder formed in said casing adjacent said opening,
  - a piston movable exactly in said cylinder between a first position and a second position thereof and parallel to said axis of rotation, said piston being operatively connected with said engaging means and extending through said opening into said clutch housing, said piston being spaced from said gear shaft.
  - a single pressure supply connection formed on said casing for providing a pressure medium,
  - at least one solenoid valve for supplying a pressure medium into said cylinder operatively connected with said single pressure connection, said piston being displaced to said first position corresponding to the disengagement of said gear and engine shafts,
  - at least one solenoid valve for venting said cylinder upon shifting said piston toward said second position corresponding to the engagement of said gear and engine shafts,
  - measuring means for defining an axial displacement of said piston, said means being mounted in said casing, and
  - a single multiple plug junction mounted on said casing for operatively interconnecting said measuring means and said solenoid valves in response to a signal monitoring a selective operation of said valves for displacing said piston to respective one of said first and second positions thereof defined by said measuring means.

8. The clutch assembly defined in claim 7 wherein an axial displacement of said piston between said first and second axial positions define a total stroke of the piston, said total stroke being grater than a required power stroke for engagement of said gear and engine shafts.

9. The clutch assembly defined in claim 7 wherein said engaging means are provided with:
- a lever pivotal about a pivot axis extending horizontally perpendicular to said axis of rotation of said gear shaft, said lever being operatively connected with said piston by one end thereof;
- a disengaging fork on said gear shaft connected with the other end of said lever, and
- a clutch disk mounted fixedly on said gear shaft and spaced axially from said lever, said clutch disk being supported by a pressure plate operatively connected with said fork in said second position of the piston and being axially displaced form said clutch disk in said first position of said piston.

10. The clutch assembly defined in claim 7, further comprising:
- external controlling means electrically connected with said solenoid value and said measuring means through said single plug junction for producing said signal,
- a pressure medium source supplying said pressure medium into said cylinder through said single pressure connection connected with said solenoid value for supplying, and
- a single venting connection mounted on said casing and connected with said solenoid valve for venting, said solenoid valve for venting and valve for supplying being solenoid valves.

11. The clutch assembly defined in claim 10 wherein two solenoid valves for venting and two solenoid valves for supplying are provided, each pair of said solenoid valves being respectively connected with said single pressure connection, with said single venting connection and with said plug junction.

12. The clutch assembly defined in claim 10 wherein each of said solenoid valves is provided with a respective shutter.

13. The clutch assembly defined in claim 10 wherein said solenoid valves have different capacities of flow of said pressure medium.

* * * * *